April 10, 1934.  A. LACK ET AL  1,954,138
CONNECTING ROD
Filed July 29, 1932
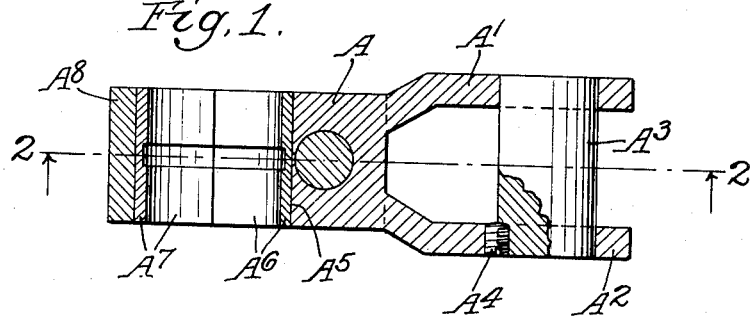
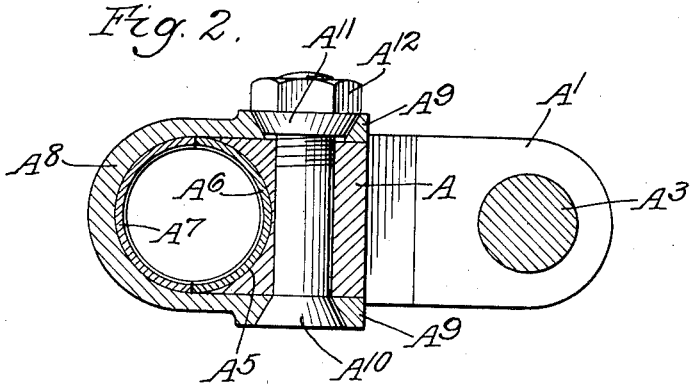
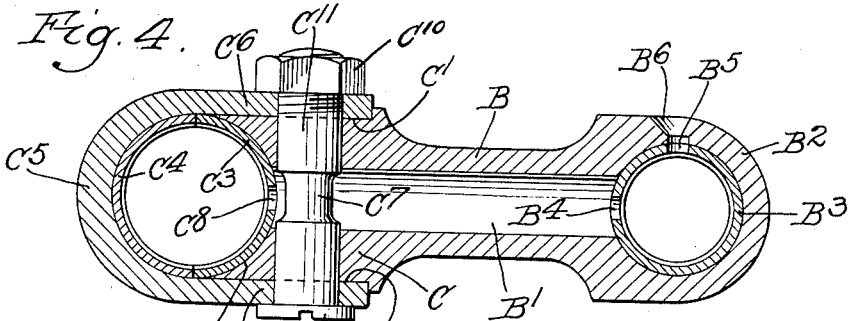
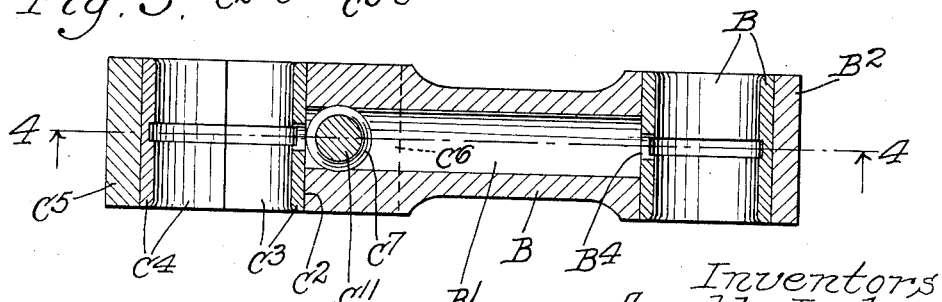
Inventors
Arnold Lack
Olaf F. E. Stromberg
by
Attorneys Patented Apr. 10, 1934

1,954,138

UNITED STATES PATENT OFFICE 1,954,138

CONNECTING ROD

Arnold Lack, Wilmette, and Olaf E. E. Stromberg, Chicago, Ill.; said Lack assignor to said Stromberg Application July 29, 1932, Serial No. 625,877

2 Claims. (Cl. 74—17)

Our invention relates to improvements in connecting rods for internal combustion engines and the like and has especial applicability to the engine torus cylinder type wherein space is at a premium and wherein it is impossible to use, because of lack of room, the usual type of bolted connecting rod cap.

Our invention is illustrated more or less diagrammatically in the accompanying drawing, wherein—

Figure 1 is a longitudinal section through one form of the connecting rod;

Figure 2 is a section along the line 2—2 of Figure 1;

Figure 3 is a section of a modified form of connecting rod along the same plane as the plane of Figure 1;

Figure 4 is a section along the line 4—4 of Figure 3.

Like parts are indicated by like characters throughout the specification and drawing.

Referring first to Figures 1 and 2, the connecting rod, it will be noted, is made in two parts. There is a central member A. Projecting from it to one side are the fork members $A^1$ $A^2$ apertured and receiving the wrist pin $A^3$. The wrist pin is held in place by a flush key screw $A^4$. The opposed side of the member A is semi-circular in its outer periphery as at $A^5$ and contains a semi-circular bearing sleeve $A^6$ in opposition to a somewhat similar semi-circular bearing sleeve $A^7$ held in place in opposition to the sleeve $A^5$ by means of the U-shaped member $A^8$. This U-shaped member has two extension lugs $A^9$ which rest against the opposed sides of the member A and which are held in position thereon by means of the taper headed holding screw $A^{10}$, there being a washer $A^{11}$ at the opposed end of the screw held in place by the nut $A^{12}$. Thus the two separate parts of the connecting rod are held together in a unit structure by the holding screw which is intermediate the big end and the wrist pin. In the alternate form shown in Figures 3 and 4, the connecting rod is hollow. In this case the connecting rod B is hollow and has extending throughout its length the cylindrical passage $B^1$. It is enlarged at one end as at $B^2$ to enclose the cylindrical bearing sleeve $B^3$ apertured at $B^4$ in communication with the hollow $B^1$ and apertured at $B^5$ in communication with the oil pocket $B^6$. The big end C has two opposed parallel surfaces $C^1$, a semi-cylindrical surface $C^2$ in which is seated the semi-cylindrical bearing sleeve $C^3$ in opposition to a semi-cylindrical bearing sleeve $C^4$ which is held in place by means of the stirrup $C^5$ having the parallel arms $C^6$ engaging parallel surfaces $C^1$. The bolt $C^{11}$ extends through the two members $C^6$ and the big end C passing through the cylindrical aperture $B^1$, the bolt being reduced at $C^7$ so as to permit a clear passage of oil to the aperture $C^8$ in the sleeve $C^3$; the flat bolt head $C^9$ and nut $C^{10}$ hold the stirrup in position on the big end.

Both forms of connecting rod have this in common that the big end comprises the two split bearing sleeves held together in working relation by a U-shaped stirrup, the U-shaped stirrup having flat faced arms enclosing the big end of the connecting rod engaging parallel surfaces thereon and clamped tightly in position thereon by the through bolt which holds them in place but which carries the load in shear so that the threaded nut serves only to lock the parts together and make a tight construction but does not carry the working load.

We claim:

1. In a connecting rod for engines and the like, a big end having two parallel flat sides and between them a semi-cylindrical surface, shoulders integral with the big end bounding the parallel flat sides along lines parallel with the axis of the semi-cylindrical surface and widely spaced from the semi-cylindrical surface, a stirrup having two parallel sided arms in opposition to the flat surfaces on the big end and a semi-cylindrical surface between them, the ends of the stirrup abutting said shoulders, the ends of the stirrup and big end being apertured perpendicular to the axis of the semi-cylindrical surfaces, a holding member passing through said apertures and in direct connection with the big end and with the stirrup.

2. In a connecting rod, a hollow tubular member, each end of which is larger in cross sectional area than the central portion, one end being apertured at right angles to the tubular portion, a bearing sleeve contained therein, having an aperture of smaller diameter than and in register with the hollow portion, a U-shaped yoke mounted on the opposed end of the connecting rod and enclosing it to form a cylindrical aperture parallel with the first mentioned aperture and so perpendicular to the hollow portion of the connecting rod, a split bearing sleeve contained within said aperture, the sleeve being apertured in register with the hollow portion of the connecting rod, shoulders on the connecting rod abutting against the ends of the U-shaped yoke, a pin extending through the connecting rod and through the two ends of the yoke to hold it in place, there being clearance for oil flow around the pin where it passes through the hollow portion of the connecting rod.

ARNOLD LACK.
OLAF E. E. STROMBERG.